Figure 1:
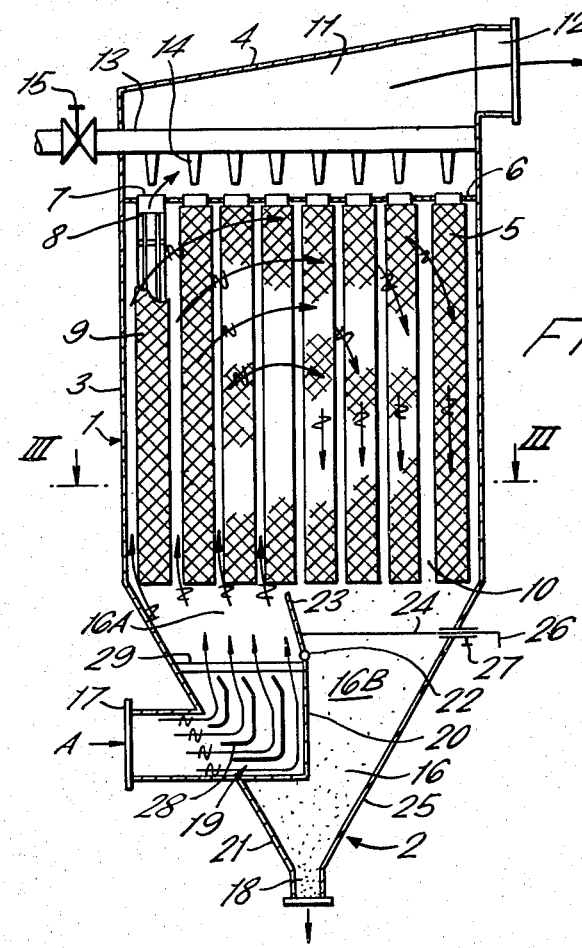

United States Patent
Böckman

[11] 3,926,595
[45] Dec. 16, 1975

[54] DUST FILTER APPARATUS
[75] Inventor: Ole Kristian Böckman, Oslo, Norway
[73] Assignee: Aktiebolaget Svenska Flaktfabriken, Nacka, Sweden
[22] Filed: Jan. 18, 1974
[21] Appl. No.: 434,420

[30] Foreign Application Priority Data
Jan. 22, 1973 Norway.............................. 250/73

[52] U.S. Cl. .................. 55/302; 55/324; 55/335; 55/341; 55/418; 55/465
[51] Int. Cl.² ................. B01D 46/04; B01D 51/00
[58] Field of Search ............ 55/302, 301, 324, 326, 55/335, 341, 418, 464, 465, 484, 361, 424

[56] References Cited
UNITED STATES PATENTS

| | | | |
|---|---|---|---|
| 1,026,432 | 5/1912 | Dey | 55/302 X |
| 1,292,450 | 1/1919 | Fisher | 55/464 |
| 1,454,492 | 5/1923 | Stroud | 55/341 X |
| 1,601,148 | 9/1926 | Ruemelin | 55/325 X |
| 3,409,131 | 11/1968 | Petersen et al. | 55/418 X |
| 3,726,066 | 4/1973 | Colley et al. | 55/302 |

Primary Examiner—Frank W. Lutter
Assistant Examiner—Kathleen J. Prunner
Attorney, Agent, or Firm—Howson and Howson

[57] ABSTRACT

A dust filter has a filter chamber with a set of filter bags therein and an outlet for separated gas, a bottom chamber provided with at least one dust-containing gas inlet and a separated dust outlet, the bags arranged for gas flow through the sides of and into the bags and out of openings in the top of the bags, reverse flushing means for directing flushing of gas into the opening of bag, a partition wall dividing the bottom chamber into separated compartments, the partition wall extending from a location beneath the dust-containing gas inlet and upwardly into close proximity of the lower end of the filter bag set to provide at least one inlet compartment for supply of dust-containing gas to a limited portion of the filter bag set and at least one outlet compartment for receiving the separated dust from the remaining portions of the filter bag set.

9 Claims, 5 Drawing Figures

DUST FILTER APPARATUS

This invention relates to a dust filter apparatus of the kind comprising a filter housing with a filter chamber for supply of dust-laden, impurified gas from below and removal of purified gas at the top, said chamber comprising a plurality of suitably stiffened filter bags suspended at their open upper ends and adapted for a gas flow direction from without and into the bag and inward return gas scavenging, such as air scavenging, wherein the filter bags are so positioned that a free passage is provided for impurified gas outside the bags at least in one direction through the filter chamber, at least one outlet chamber for purified gas arranged above the filter chamber, and at least one bottom chamber arranged beneath the filter chamber and having at least one inlet for dust-laden gas and outlet for separated dust. The bottom chamber has preferably a downwardly diminishing cross section with the outlet for separated dust provided lowermost. The filter chamber may have a rectangular or circular cross section. In known embodiments the filter chamber often has a top wall in which the filter bags are suspended but apparatuses are also found wherein the bags are suspended in such a manner that no top wall proper is found. The filter bags are commonly of textile fabric and comprise means preventing the bags from collapsing owing to the pressure difference during operation. Above the top of the filter chamber generally, there is provided a scavenging device with flushing means for each bag. Such devices are formerly known and, therefore, will not be described in detail.

In filters of this kind the filter bag set of distended normally cylindrical filter bags hangs downwardly into the filter chamber, and the bags are surrounded by the impurified gas of the outside, said gas being purified from the dust-like impurifications by passing through the filter fabric from the outside and into the bag. The bags are cleaned individually or preferably row by row as flushing air is blown more or less as a pulse down into the clean side of the bag, whilst the filter otherwise is in full operation. During flushing a positive pressure is established in the interior of the bags being flushed, and the flow direction through the bag fabric is reversed for a moment. The pressure shock from the short return air stream through the filter fabric breaks and flushes away the dust layer that has been collected on the outside of the bag. Immediately after the flushing normal pressure conditions are reestablished over the bag or bag row that was flushed and gas flows again from the outside and in through the bag fabric.

The cleaning of the filter fabric in the bags is very effective in this kind of filter. Since the flushing of individual bags or individual rows of bags is carried out without stopping the gas flow through the filter by means of chokes or the like, in practice scavenging can be performed far more frequently than is the case in filters of other kinds, where the whole filter chamber must be closed for cleaning the bag set. For this reason filters of the kind mentioned above may be operated with very high gas quantities in relation to the filter fabric area without un-reasonable pressure drop through the fabric and such filters are also useful for relatively very high dust concentrations.

As already mentioned, normally filters of the kind discussed have a bottom hopper where the impurified gas is introduced and where also the separated dust falls down, and further, a filter chamber surrounding the bag set and a clean gas chamber at the top above the bag set outlet and where the scavenging means are also provided. Upon having been introduced into the bottom hopper, the impurified gas continues its movement substantially vertically upwardly between and over the bags in the filter set with a vertical velocity decreasing continuously as the gas is sucked continuously through the filter fabric along the entire height of the filter bags.

A normal dimensioning for such a so-called high efficiency filter accounts for filter loads of 50 – 200 m$^3$ gas/m$^2$ of filter fabric per hour, or more. The corresponding average vertical velocity of the impurified gas upwardly through the bag set will be about 0.5 – 2m/sec. lowermost in the bag set and decreasing continuously to about no velocity uppermost in the bag set. Considerably higher velocities can occur locally because of uneven distribution.

The upwardly directed gas velocity of 0.5 – 2m/sec. at the bottom of the bag set corresponds to the equivalent falling velocity for particles having a diameter in the range 100 – 300 $\mu$. This gas velocity is also maintained during flushing of individual bags or rows of bags. This means that released dust having a particle size less than in the size range 100 – 300 $\mu$ does not fall downwardly against the raw gas flow but keeps on floating in the gas flow within the bag set. The dust of that sort that is being flushed away from one bag or a row of bags during the scavenging will then be substantially sucked into the dust layer on the adjacent bags or back to the same bag as soon as the flushing has ceased. Therefore, fine dust of this sort cannot fall down through the filter set and into the bottom hopper before it has agglomerated into coarser fragments or lumps. Such a tendency to agglomerate is a material property which varies very much from one kind of dust to another.

It is easily realized that problems occur when the gas to be filtrated contains fine grained dust with a corresponding low falling velocity and at the same time has poor tendency to agglomerate. A dust of this kind is accumulated in the bag set and covers the bags with layers of progressively increasing thickness. This implies a continuously increasing pressure drop over the bag fabric and reduced filter capacity.

Dusts of some particular types, especially waste fume from metallurgical melting processes and containing partly extremely fine (less than 1/1000 mm) particles with poor tendency to agglomerate, have shown in practice to have such a behavior in filters of the kind described. The pressure drop across the filter increases rapidly during operation when fine dust is being accumulated in the filter set and the capacity drops. The pressure and capacity will first stabilize when the pressure over the dust layer on the bags becomes sufficiently high to compress the dust so strongly that it agglomerates and becomes able to fall away in the shape of coarse grains or lumps from the bag set. For some types of dust, particularly melting fumes, this stable pressure is so high that this kind of filter is not of practical use any longer.

An even velocity distribution of the raw gas on the way into and through the bag set is very important. Velocity peaks owing to a poor gas distribution implies increased wear on the filter fabric at the particular location. The gas distribution is especially critical when the raw gas contains sharp, strongly abrasive dust in great dust concentrations.

As an example of a process in which filter apparatuses of the kind mentioned above are used, there can be mentioned purification of waste gas of fumes from aluminum electrolysis furnaces using injection of alumina (aluminum oxide) into the raw gas flow according to the so-called dry method. The waste gas from these furnaces contains gaseous hydrogen fluoride and more or less fluorine-containing dust consisting partly of metallurgical melting fume with the properties as described above as unfavorable for filter operation. The injected alumina will normally have a grain size substantially under 0.15 mm.

In the above mentioned dry process the gaseous hydrogen fluoride contents of the raw gas are absorbed with very high efficiency by the injected alumina. This process requires a smooth mixing of oxide and gas into one another, and the most favorable efficiencies are obtained by good contact and longest possible time of contact between raw gas and alumina. Both the oxide injected and the natural dust contents of the raw gas are then separated in a high efficiency filter.

One is interested in obtaining a smooth cover of alumina on the bags, as an additional adsorbtion of hydrogen fluoride is obtained during the passage of the gas through said oxide layer, which again increases the efficiency of the process.

Because of the desirability of obtaining a smooth dust cover on the bags and because of the large dust quantities (oxide quantities) taking part in the process, the high efficiency filters of the above mentioned kind are best suited for this process.

According to the properties of the dust types in question, one has difficulties in this process as to the pressure drop and the capacity of the high efficiency filter as disclosed above. Further, alumina is an extraordinary sharp and abrasive material and the concentration in the raw gas is high (5–20 g/m$^3$). Therefore, the gas distribution in the filter chamber is highly critical.

One object of the invention is to provide a dust filter apparatus of the kind mentioned above, wherein the problems discussed above are avoided or reduced to a minimum.

Another object of the invention is to provide an apparatus which makes it possible to adapt the time of contact or the dwelling time for dust-like adsorbent which is added to a gas to provide adsorbtion in dependency on the particle size and falling velocity of the individual particles of the adsorbent and to adapt the dwelling time for the adsorbent ahead of and in the filtering zone according to the adsorbtion efficiency.

In some cases, the gas to be filtrated can contain coarse, easily separable dust fractions undesired in the filter because such fractions imply an extra load and a particularly heavy wear. For example, in some kinds of melt fumes coarse particles are found some of which arrive at the filter as still glowing embers.

Therefore, it is also one object of this invention to provide an apparatus which allows separation of such particles before they come into contact with the bag set of the filter.

A substantial advantage of the apparatus according to the invention resides in the fact that the partition wall or walls, respectively also divide the flow system in the filter chamber into at least two portions, viz., one or more portions located above the inlet portion or portions, respectively, of the bottom chamber wherein the raw gas is flowing substantially upwardly and a portion above the outlet portion of the bottom chamber wherein the remainder of the raw gas also is imparted a downwardly directed movement. Therefore the dust flushed away from the bags will follow the gas flow and will be brought by means of this gas flow through the bag set and down into the outlet portion of the bottom chamber wherein the gas velocity is 0 and even the finest grained easily floating dust particles will fall down. Accumulation of such fine dust in the bag set is effectively eliminated and the filter is made to work with an advantageous low pressure drop relative to the gas load.

Another advantage of the apparatus according to the invention resides in the fact that the partition wall or walls are provided with a pivotably adjustable top portion. In this way the vertical velocity of the raw gas may be adjusted. Thereby for example, the dwelling time for a dust-shaped adsorbent added to the raw gas to provide adsorbtion can be adapted in dependency on the particle size and the falling velocity of the individual particles of the adsorbent. By pivoting the top portion of the partition wall away from the gas inlet, the inlet zone for raw gas is given an upwardly increasing cross section with the consequence that particles are given an extended dwelling time in the upper portion of this zone. Other favorable features will appear from the following description of some examples of apparatus according to the invention.

Figure 2:
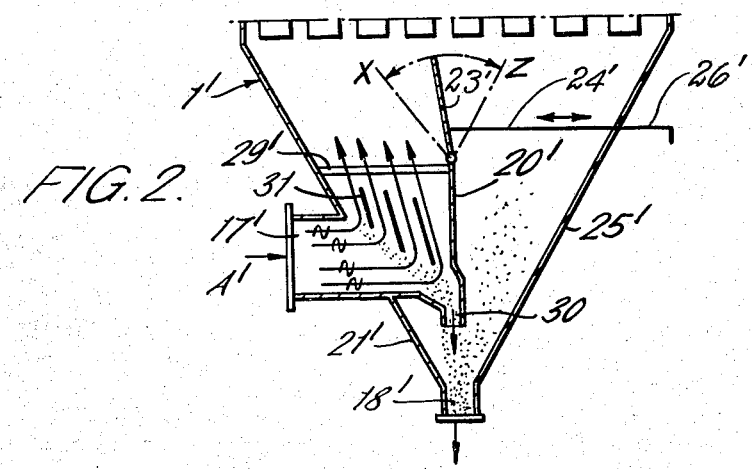
Figure 3:
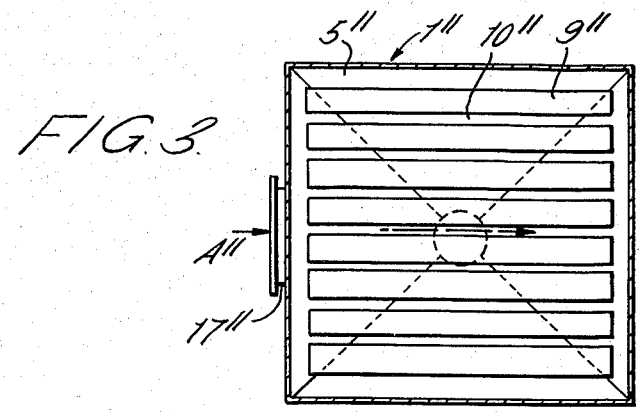

In the drawings:

FIG. 1 shows schematically a vertical section through a filter apparatus made in accordance with the invention, FIG. 2 shows in the same way as FIG. 1 a modified embodiment of the inlet portion of the bottom chamber below the filter, and FIG. 3 shows a horizontal cross section substantially along the line III—III in FIG. 1 but shows an apparatus with differently made dust bags. In FIGS. 2 and 3 the same reference numerals are used for the same elements as in FIG. 1 but with the affix ' or '', respectively.

Figure 4:
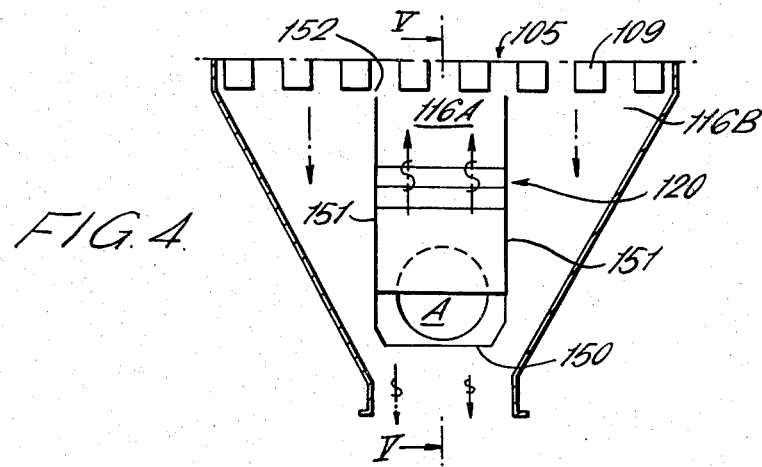
Figure 5:
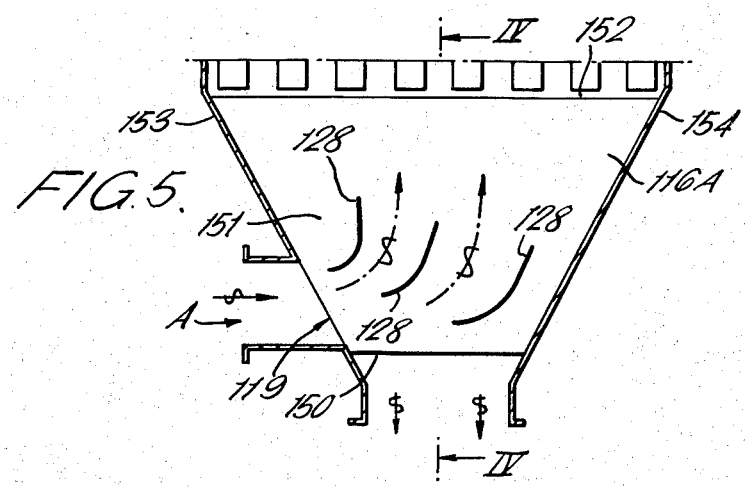

FIG. 4 shows still another embodiment of the bottom chamber and particularly the partition wall as section taken along lines IV—IV in FIG. 5, and FIG. 5 shows a vertical section along the lines V—V in FIG. 4 and is similar to FIGS. 1 and 2 mentioned above.

In the drawing, the filter housing of the filter apparatus is denoted by 1. In this particular case the housing is intended to be made with a rectangular cross section, however, it can also have a circular cross section. The housing comprises a hopper-shaped bottom portion 2, a parallelepiped-shaped main portion or filter portion 3 and a top portion 4.

The filter portion 3 of the housing defines a filter chamber 5 having a rectangular cross section. The filter chamber has a horizontal top wall 6 which is made with a plurality of apertures 7 in which a corresponding plurality of filter bags 9 is suspended by means of suspending or fastening means 8. The bags are open at the top and closed at the bottom. The bags have a circular or square cross section and are spaced from one another to provide intermediate spaces 10 as shown. Also, in the direction perpendicular to the plane of the drawing, the bags are spaced apart from each other.

Above the filter chamber 5 is arranged an outlet chamber 11 for purified gas. The gas outlet is denoted by 12. In the outlet chamber 11 is also arranged a scavenging means 13 with a plurality of flushing nozzles 14 adapted to blow gas, e.g. air, into the bags 9. A control valve for the flush gas conduit is denoted by 15.

In the bottom portion 2 of the filter housing 1 is provided a hopper-shaped bottom chamber 16 having an inlet conduit 17 for impurified gas mounted in one of the walls of the chamber and an outlet 18 for separated dust in the lowermost portion of the chamber, the impurified gas being supplied into the conduit 17 at the inlet port A and thence into the bottom chamber 16.

In FIG. 3 the filter chamber 5'' is shown provided with filter bags 9'' having an oblong rectangular horizontal cross section. With the bags shaped in this way the bags are suitably arranged in the filter chamber with intermediate spaces 10'' extending in a direction, which considered in the horizontal plane, coincides with the direction of the entraining gas at the inlet Port A''.

The inlet aperture for impurified gas in the side wall of the bottom chamber 16 is denoted by 19. In the bottom chamber 16 is provided a stationary partition wall 20. The partition wall extends from a location below and inwardly of the inlet 19 in the side wall 21 of the bottom chamber first in a substantially horizontal direction and then vertically upward and the wall ends at a distance beneath the lower ends of the bags 9. To the upper horizontal edge 22 of the partition wall 20 a partition wall plate 23 is hinged and made so that when in vertical position it ends rather closely at the lower ends of the filter bags 9. As the partition wall 20 is, along the longitudinal edges thereof, affixed to the opposite side walls of the bottom chamber 16, the opposite edges of the partition wall plate 23 are arranged at a distance from said side walls. So the partition wall plate 23 is pivotally connected a control rod 24, which extends through a suitably sealed aperture in the side wall 25 of the bottom chamber and extends outwardly of the bottom chamber, and is provided there with a handle 26 or the rod can be connected with a means (not shown) to pivot the partition wall plate 23 toward one or the other positions X, or Z, respectively, as indicated in FIG. 2. The partition wall plate 23 can be locked in an adjusted position by a suitable locking means 27.

It will be understood that the partition wall 20, 23 divides the bottom chamber 16 into two portions, viz., and inlet portion 16A for impurified gas and an outlet portion 16B for separated dust which is discharged through the outlet 18. In the inlet portion 16A of the bottom chamber 16, a plurality of guide vanes 28 is arranged to conduct and distribute the gas flow on its way upwardly towards the filter chamber 5. Additional guide vanes 29 can be arranged at right angles to the first mentioned baffles for an additional increment of the distributing and smoothing effect.

In the embodiment according to FIG. 2, the partition wall 20' has a downwardly directed outlet 30 arranged at the transition location from the more or less horizontal portion thereof into the substantially vertical portion. In lieu of the guide vanes 28 shown in FIG. 1 deflecting smoothly the gas flow upwardly, in this case a plurality of impact and guide plates 31 is provided located so in relation to the outlet and one another that the lower edge portions of the impact plates 31 are lying more or less in a plane extending obliquely downwardly towards said outlet 30. The upper portions of the impact plates 31 operate in a normal way as conduit plates or baffles.

When dust-laden gas flows into the apparatus through the inlet conduit 17, it will be deflected upwardly because of the partition wall 20, 23 towards a portion of the filter bag set in the filter chamber 5 with the consequence that the chamber 5, when regarding the flow system, comprises a chamber portion having a gas flowing upwardly and a portion wherein the gas movement is directed downwardly. While the inlet velocity of the gas in the inlet portion 16A of the bottom chamber is quite substantial and adjusted according to need, the eventual gas velocity in the outlet portion 16B is equal to 0. When the apparatus is in operation and the filter bags are flushed by the means 13,14 whilst the operation otherwise continues, the dust flushed away is carried away with the gas flow moving upwardly and then decliningly and is transferred to the portion of the filter chamber in which the direction of movement of the gas is orientated downwardly, so that the particles of minimal size will follow the gas flow with progressively decreasing velocity and will fall down into the outlet portion 16B of the bottom chamber wherein the prevailing gas velocity is equal to 0 so that even the finest dust will fall down by gravity forces alone. In this way it is ensured that the very fine grained dust flushed from the bags in general follows a well-defined substantially semi-circuilar flow pattern through the spaces in the filter bag set and finally is conducted by the raw gas flow down toward the dust outlet portion of the bottom chamber, into which bottom chamber the dust falls under influence of gravity forces only without being blown back up into the filter bag by a generally-upward raw gas flow over the whole bottom hopper area which has typically been the case in the previously known embodiments.

By means of the partition wall plate 23, the inlet cross section to the filter chamber can be adjusted for adjusting the upward velocity of the impurified gas flow. As accumulation of an excess load of fine dust on the bag set is avoided, the filter can operate with a substantially lower pressure drop relative to the gas load.

The pivotable partition wall portion 23 can be adjusted as mentioned for adoption to varying dust composition in the raw gas. Under some circumstances it will be suitable to adjust the plate 23 to the position shown at z in FIG. 2, so that the inlet portion ahead of the filter bag set receives an upwardly increasing cross section. Thereby the gas velocity will decrease correspondingly. This may be advantageous in a case where it is operated with a gas containing a dust-shaped adsorbent which is required to be retained in the gas flow as long as possible. The adsorbent particles will receive an extended dwelling time with reduced velocity in the inlet portion enlarged in this manner.

Under conditions when the gas contains very coarse and easily separable dust particles undesired in the filter, the embodiment according to FIG. 2 can be used. The raw gas flow introduced at A' impacts the lower edge portions of the baffles 31 with the result that the heaviest particles are separated and fall down and are discharged from the inlet portion of the chamber through the outlet 30. Obviously, this outlet must be small enough that the raw gas passing the outlet along with the dust will produce only an insignificant gas velocity upward through the outlet portion 16B, not interfering with the gravity fall down of the dust into the outlet portion toward the dust outlet 18.

The embodiment of FIGS. 4 and 5 is similar to the embodiment of FIG. 1 and the same numerals are used for the same parts, however, with addition of one hundred ahead of the numeral. In this embodiment the bottom chamber 116 is provided with a partition wall 120 of generally U-shaped configuration as shown in FIG.

4. As shown in FIG. 5, the partition 120 extends from the side wall 153 of the bottom chamber wherein the inlet 119 is provided to the opposite side wall 154 of the bottom chamber and is secured therewith, e.g. by welding. The partition 120 has a bottom 150 and two side walls 151. The bottom 150 extends in a horizontal plane somewhat beneath the inlet aperture 119 for the gas to be purified. The side walls 151 of the partition extend upwardly from the bottom 150 and have their top edges 152 extending horizontally very closely to the lower ends of the dust filter bags 109 as shown in FIG. 4. In this way the bottom chamber 116 is divided into an inlet portion 116A for the raw gas and an outlet portion 116B for the separated dust. The flow directions for the gas and for the separated dust are shown by arrows.

Baffles 128 of suitable shape are provided in the inlet portion 116A, extending intermediate and secured to the side walls 151 of the partition 120. The operation of this embodiment is similar to the embodiments of the preceding Figures apart from the fact that the flowing system of the apparatus of this embodiment comprises one filter zone wherein the gas flow is directed upwardly and two zones wherein the direction of motion of the dust particles is directed downwardly.

It will be understood that the embodiments of FIGS. 1, 2, 4 and 5 can be combined with one another in some respects. Thus, the upper portions of the side walls 151 of the partition 120 can be made as separate wall members (not shown) arranged pivotably relative to the remaining parts of the side walls similarly to the embodiment of FIG. 1. It would also be obvious to provide the bottom chamber 116 with two raw gas inlets A arranged oppositely one another in the side walls 153 and 154, respectively. In this case, the arrangement of the baffles 128 would of course be adapted to the particular gas entrance conditions. When considering the embodiment as shown in FIG. 4, it is also possible to provide two inlets A in one and the same wall 153 spaced from one another both provided with a partition 120 of the configuration as shown in FIG. 4, said partitions being spaced from one another or having a side wall in common such as the wall 151. Also in the embodiment of FIGS. 1 or 2, two or more gas inlets A can be provided side by side if the dimensions of the apparatus make such an arrangement suitable.

By means of the apparatus according to the invention flushing of the filter bags has been substantially improved, while abrasive wear on the bags has been reduced without separation of particulate matter ahead of the filter bag.

It will be understood that in each of the embodiments shown and described, the partition wall in the bottom chamber prevents gas flow in the outlet compartment, and instead causes a flow from the inlet compartment which is initially directed primarily upward into the filter bag chamber; then, because of the containing effect of the top of the filter chamber, the gas flow diverges transversely toward one or more of the side walls which are spaced transversely of the region above the inlet chamber; next, due to the containing effect of the latter side walls, the gas flow then turns downwardly above the outlet chamber. Since the suction motivating the gas flow is limited to the interiors of the bags, the latter downward flow of the gas is diverted into the bags, and is thereby substantially extinguished within the filter chamber, so that there is substantially no vertical velocity component of gas flow in the vicinity of the lower open end of the filter chamber above the outlet compartment. Accordingly, fine particulate matter separated from the exteriors of the bags during reverse flushing thereof is carried from the passages between the bags above the gas inlet, into passages above the outlet compartment, and there enabled to settle by gravity into the outlet compartment as desired.

While the invention has been described with particular reference to specific embodiments thereof, it will be understood that it may be embodied in a variety of forms diverse from those specifically shown and described, without departing from the spirit and scope of the invention as defined by the appended claims.

I claim:

1. In appparatus for filtering raw gas containing fine particulate matter, and of the type comprising a filter chamber having a top wall, side walls and an open lower end and containing a set of filter bags substantially vertically suspended from said top wall and horizontally spaced apart by passages to permit free passage of said gas through said bag set on the outside of said bags in the vertical direction and in at least one horizontal direction within said chamber, said filter bags having openings at their upper ends and being closed at their lower ends substantially adjacent said open lower end of said filter chamber, at least one outlet chamber above said top wall and communicating with the interiors of said bags through openings in said top wall and through said upper-end openings for receiving gas filtered through the walls of said bags, means for reverse flushing said bags from the inside to separate deposited fine particulate matter from their exterior surfaces, at least one bottom chamber having side walls and arranged beneath said filter chamber and closing said open lower end of said filter chamber and having at least one inlet for said gas whereby a gas pressure difference applied between said gas inlet and said outlet chamber and having its lowermost pressure value at said outlet chamber will establish a flow of gas from said bottom chamber into said bags and therethrough to said outlet chamber, said bottom chamber having an outlet for particulate matter separated from said filter bags by said reverse flushing, the improvement comprising:

partition means separating said bottom chamber into at least one inlet compartment and at least one outlet compartment, said inlet compartment communicating with said gas inlet to establish an initial upward flow of said gas through the passages located substantially above said inlet compartment, said outlet compartment communicating with said particulate-matter outlet for receiving said separated fine particules, said inlet compartment communicating with said filter chamber through a limited portion of said open lower end of said filter chamber, said outlet compartment communicating with said filter chamber through a remaining portion of said open lower end of said filter chamber, whereby said initial upward flow of said gas from said inlet compartment progressively diverges laterally and then downwardly in said passages above said outlet compartment to carry said separated particulate matter from the passages above said inlet compartment into the passages above said outlet compartment, said partition means establishing substantially no flow conditions in said outlet compartment to allow said particulate matter to settle by gravity within said outlet compartment.

2. The apparatus of claim 1, in which said partition means comprises at least one partition wall extending from below said gas inlet to a position in close proximity to the lower end of said bag set to form a gas conduit for flow of said gas from said gas inlet to the lower end of said limited portion of said open lower end of said filter chamber.

3. The apparatus of claim 2, in which said partition wall comprises an upper wall portion pivotable to vary the cross-sectional area of the outlet of said gas conduit, and means for adjusting the angular position of said pivotable wall portion.

4. The apparatus of claim 3, comprising guide vane means in said gas conduit for smoothing and upwardly directing the flow of said gas in said gas conduit.

5. The apparatus of claim 1, comprising impact plates in said inlet compartment for causing abrupt deflection of said gas flow to separate coarse particulate matter from said gas.

6. The apparatus of claim 5, comprising an outlet for coarse particulate matter from the lower portion of said inlet compartment.

7. The apparatus of claim 1, wherein said inlet compartment extends along one side wall of said bottom chamber and less than completely across said bottom chamber from said one wall, and said gas inlet is provided in said one bottom chamber side wall.

8. The apparatus of claim 1, in which said at least one inlet compartment is spaced inwardly from both of a first pair of opposite side walls of said bottom chamber, and said at least one outlet compartment extends between said side walls of said bottom chamber and said partition means.

9. The apparatus of claim 8, in which said inlet compartment extends completely across said bottom chamber between a second pair of opposite side walls thereof, thereby to define a plurality of outlet compartments, and said gas inlet extends through one of said second pair of opposite side walls.

* * * * *